United States Patent
Christianson

(10) Patent No.: US 7,832,112 B2
(45) Date of Patent: Nov. 16, 2010

(54) VIAL-MOUNTING STRUCTURE

(75) Inventor: John Christianson, Waukesha, WI (US)

(73) Assignee: Empire Level Mfg. Co., Mukwonago, WI (US)

( * ) Notice: Subject to any disclaimer, the term of this patent is extended or adjusted under 35 U.S.C. 154(b) by 1 day.

(21) Appl. No.: 12/268,278

(22) Filed: Nov. 10, 2008

(65) Prior Publication Data

US 2010/0115780 A1    May 13, 2010

(51) Int. Cl.
*G01C 9/28* (2006.01)
(52) U.S. Cl. .............................. 33/365; 33/376; 33/379
(58) Field of Classification Search ........... 33/379–381, 33/383–387, 371, 378
See application file for complete search history.

(56) References Cited

U.S. PATENT DOCUMENTS

| | | | |
|---|---|---|---|
| 5,033,199 A * | 7/1991 | Wilcox et al. .................. | 33/379 |
| 6,176,020 B1 * | 1/2001 | Scarborough ................. | 33/379 |
| 6,591,510 B2 | 7/2003 | Tacklind | |
| 6,760,975 B1 * | 7/2004 | Schmidt ....................... | 33/382 |
| 6,792,686 B2 * | 9/2004 | Krehel et al. .................. | 33/382 |
| 7,472,487 B2 * | 1/2009 | Tran et al. ..................... | 33/379 |
| 7,568,292 B2 * | 8/2009 | Maruyama .................... | 33/385 |
| 2005/0160610 A1 | 7/2005 | Scheyer | |
| 2007/0113414 A1 * | 5/2007 | Levinson et al. .............. | 33/451 |
| 2007/0266578 A1 | 11/2007 | Tran et al. | |
| 2007/0271802 A1 | 11/2007 | Tran et al. | |

FOREIGN PATENT DOCUMENTS

| | | |
|---|---|---|
| CN | ZL 97242950.6 | 3/1999 |
| DE | 3127399 | 1/1983 |
| DE | 3432911 | 3/1986 |
| DE | 3606774 | 9/1987 |
| DE | 199 11 798 | 9/2000 |
| EP | 0 070 476 | 7/1982 |
| EP | 0 714 014 | 11/1995 |
| ES | 1 016 834 | 12/1991 |
| JP | 11-183167 | 7/1999 |
| JP | 11-183169 | 7/1999 |
| JP | 2007-24790 | 2/2007 |
| WO | WO 97/13119 | 4/1997 |

* cited by examiner

*Primary Examiner*—Yaritza Guadalupe-McCall
(74) *Attorney, Agent, or Firm*—Jansson Shupe & Munger Ltd

(57) ABSTRACT

A level including an elongate hollow frame with two sidewalls and a topwall extending therebetween, a topnotch defined by the walls which have notch-defining edges including non-vertical surfaces, and a vial within the topnotch. A vial-mounting structure includes a vial-holding member and a locking member movably secured with respect to the vial-holding member. The vial-holding member is configured for resting on the non-vertical notch-edge surfaces. The locking member includes frame-engaging portions which press upwardly against a frame inner surface to pull the vial-holding member downwardly against the non-vertical notch-edge surfaces, thereby securing the vial-holding member to the frame. A method for securing a vial-mounting structure to the level by providing the vial-mounting structure, which includes the vial-holding member, and pulling the vial-holding member downwardly against the non-vertical notch-edge surfaces by a force from inside the frame, thereby securing the vial-holding member to the frame.

19 Claims, 6 Drawing Sheets

VIAL-MOUNTING STRUCTURE

FIELD OF THE INVENTION

This invention relates to levels and, more particularly, to structures for accurately and reliably securing vials to levels.

BACKGROUND OF THE INVENTION

In the construction industry, levels are used to ensure that structural members are installed in their exact intended orientations. Levels include plural vials, almost always including a principal center vial which is parallel to a reference surface and used to indicate a horizontal orientation. Such horizontal vial is normally secured to the level frame in a position that permits viewing of the vial from both sides and also from above to ascertain the orientation of substantially horizontal surfaces. The most desirable positioning of such vial is within a topnotch in the body of a level which topnotch is defined by two sidewalls and the topwall of a hollow level body frame. However, such positioning also presents a challenge for securing the vial to the frame. Because of the open nature of the topnotch, the vial is prone to becoming disassembled from the frame upon various impacts caused by the occasional dropping of the level or other disruptive occurrences at a construction site.

There have been various prior arrangements for mounting horizontal vials within the topnotch. Such arrangements, however, have problems and disadvantages rendering them problematic in many situations. Certain devices of the prior art are disadvantageous in requiring glueing of the mounting structure to portion of the level body. Some such prior arrangements are designed to secure the vial by extending forces directed away from each other to engage inner surfaces of opposite walls of the level frame, but such arrangements have disadvantages related to adaptability for varying level sizes and in some cases related to ease of assembly.

One example of such arrangements is described in United States Patent Application Publication No. 2005/0160610 to Scheyer. Scheyer uses a two-part mounting system with one part which holds the vial, forced against an inner surface of a bottom wall, and another part drawn against an inner surface of the opposite (top) wall. The problem of such construction is that the vial-holding part has to be accurately dimensioned for a particular level size such that this vial-holding part spans the distance between top and bottom walls to hold the vial at the correct position along the topwall. Another example of such arrangements is described in JP 2007-24790 (Feb. 1, 2007), but such arrangement pose difficulties in assembly because of the to need to gain access to internal fasteners from the end of the level body.

There is a need for an improved level which overcomes the aforementioned problems. It would be desirable to have a versatile vial-mounting structure that is suitable for levels of various sizes without any special dimensioning of the mounting structure for specific sizes. It would be desirable to develop a vial-mounting structure which is accurately and reliably secured the level body and does so without difficult assembly steps and without the need for glueing of the structure to the body. Accurate mounting of the vial-mounting structure to the level body facilitates accurate vial orientation.

OBJECTS OF THE INVENTION

It is an object of the invention to provide an improved vial-mounting structure which overcomes some of the problems and shortcomings of the prior art, including those referred to above.

Another object of this invention is to provide a vial-mounting structure which provides secure holding of a vial within a topnotch.

Another object of the invention is to provide a vial-mounting structure which is suitable for various levels without any special dimensioning for a specific level size.

Still another object of the invention is to provide a vial-mounting structure which facilitates accurate mounting of the vial with respect to the frame.

Another object of the invention is to provide a vial-mounting structure which facilitates easy assembly of a level.

Yet another object of the invention is to provide a method for securing a vial mounting structure to a level.

How these and other objects are accomplished will become apparent from the following descriptions and the drawings.

SUMMARY OF THE INVENTION

This invention, which will be described in detail below, is an improvement in levels of the type including an elongate hollow frame with two sidewalls and a topwall extending therebetween. The walls define a topnotch and have notch-defining edges which include non-vertical surfaces. A vial is mounted within the topnotch.

The term "topnotch," as used herein, refers to an open space which is formed by removing a section of a topwall and sections of sidewalls which are adjacent to the topwall. This provides space for installing a vial which has a continuous unobstructed viewing angle from three directions, i.e., both sides and above, for determining a level position of a surface upon which the bottom wall of the frame is rested.

The inventive level has a vial-mounting structure which includes a vial-holding member and a locking member movably secured with respect to the vial-holding member. The vial-holding member is configured for resting on the non-vertical notch-edge surfaces. The locking member includes frame-engaging portions which press upwardly against a frame inner surface to pull the vial-holding member downwardly against the non-vertical notch-edge surfaces, thereby securing the vial-holding member to the frame. The frame-engaging portions of the locking member preferably press upwardly against the lower surface of the topwall.

In some preferred embodiments, the non-vertical surfaces of the notch-defining edges include substantially horizontal surfaces of the sidewall-edges. Such horizontal surfaces define a notch bottom. The non-vertical surfaces also include inclined surfaces which extend from the notch bottom to the topwall. Each inclined surface is at an obtuse angle with respect to the notch bottom. It is preferred that the non-vertical surfaces further include topwall-edge surfaces which are upwardly-facing bevels adjoining the inclined surfaces of the sidewall-edges. The locking member preferably presses upwardly against the lower surface of the topwall, whereby the vial-holding member and the locking member sandwich the topwall therebetween.

The term "horizontal," as used with respect to surfaces of sidewall-edges, refers to a position of such edges when the bottom of the level frame is in a horizontal orientation.

In preferred embodiments, the vial-holding member includes a bottom portion which spans the space between the sidewalls at the notch bottom and has at least one opening therethrough. The locking member includes at least one threaded aperture axially aligned with a corresponding opening. For each threaded aperture and aligned opening, there is a threaded drawing rod in threaded engagement with the aperture. The threaded drawing rod is configured to draw the locking member upwardly toward the vial-holding member.

Such upward movement presses locking-member frame-engaging portions upwardly against the frame inner surface and pulls the vial-holding member downwardly against the non-vertical notch-edge surfaces. The locking member is preferably pressed upwardly against the lower surface of the topwall.

In some of such highly preferred embodiments, the at least one opening is a pair of spaced openings and the at least one threaded aperture includes a pair of threaded apertures.

The locking member preferably has a lower portion and two upward portions. The lower portion defines the threaded aperture. Each upward portion extends from the lower portion to terminate at an upper end which engages the frame inner surface. The vial-holding member preferably has two side portions extending from opposite sides of the bottom portion. Each side portion includes a vertical projection key. It is preferred that each of the upward portions of the locking member defines a keyway receiving a corresponding projection key therethrough. The key-keyway mating engagement facilitates alignment of the locking member and the vial-holding member.

Another aspect of this invention is a method for securing a vial-mounting structure to the level which has an elongate hollow frame with two sidewalls and a topwall which extends between the sidewalls. The topwall and the sidewalls define a topnotch. These three walls have notch-defining edges which include non-vertical surfaces. The inventive method includes providing a vial-mounting structure, which has a vial-holding member configured for resting on the non-vertical notch-edge surfaces, and pulling the vial-holding member downwardly against the non-vertical notch-edge surfaces by a force from inside the frame, thereby securing the vial-holding member to the frame.

In some preferred embodiments of the inventive method, the vial-mounting structure further includes a locking member movably secured with respect to the vial-holding member. In such embodiments, the pulling of the vial-holding member is by drawing the locking member upwardly toward the vial-holding member and against a frame inner surface. The locking member is preferably drawn until the vial-holding member is firmly pulled downwardly against the non-vertical notch-edge surfaces such that the vial-holding member is in its accurate installed position. It is preferred that the locking member presses upwardly against the lower surface of the topwall.

The non-vertical surfaces preferably include topwall-edge surfaces which are upwardly-facing bevels adjoining sidewall-edges. The locking member presses upwardly against the lower surface of the topwall to pull the vial-holding member downwardly against the topwall-edge surfaces. Thus, the vial-holding member and the locking member sandwich the topwall therebetween.

The method may further include the step of inserting the locking member into the frame prior to the drawing step. The locking member is preferably inserted into the frame through the topnotch.

The inventive method may be performed by placing the vial-holding member onto the non-vertical notch-edge surfaces after the inserting step and before the drawing step.

In some highly preferred embodiments of the inventive method, the vial-holding member includes a bottom portion spanning the space between the sidewalls at the notch bottom and having at least one opening therethrough. The locking member preferably includes at least one threaded aperture axially aligned with a corresponding opening. For each threaded aperture and aligned opening, there is a threaded drawing rod in threaded engagement with the aperture. The threaded rod is configured to draw the locking member upwardly toward the vial-holding member, thus to draw the locking member upwardly against the frame inner surface and pull the vial-holding member downwardly against the non-vertical notch-edge surfaces.

DETAILED DESCRIPTION OF PREFERRED EMBODIMENTS

Figure 1:
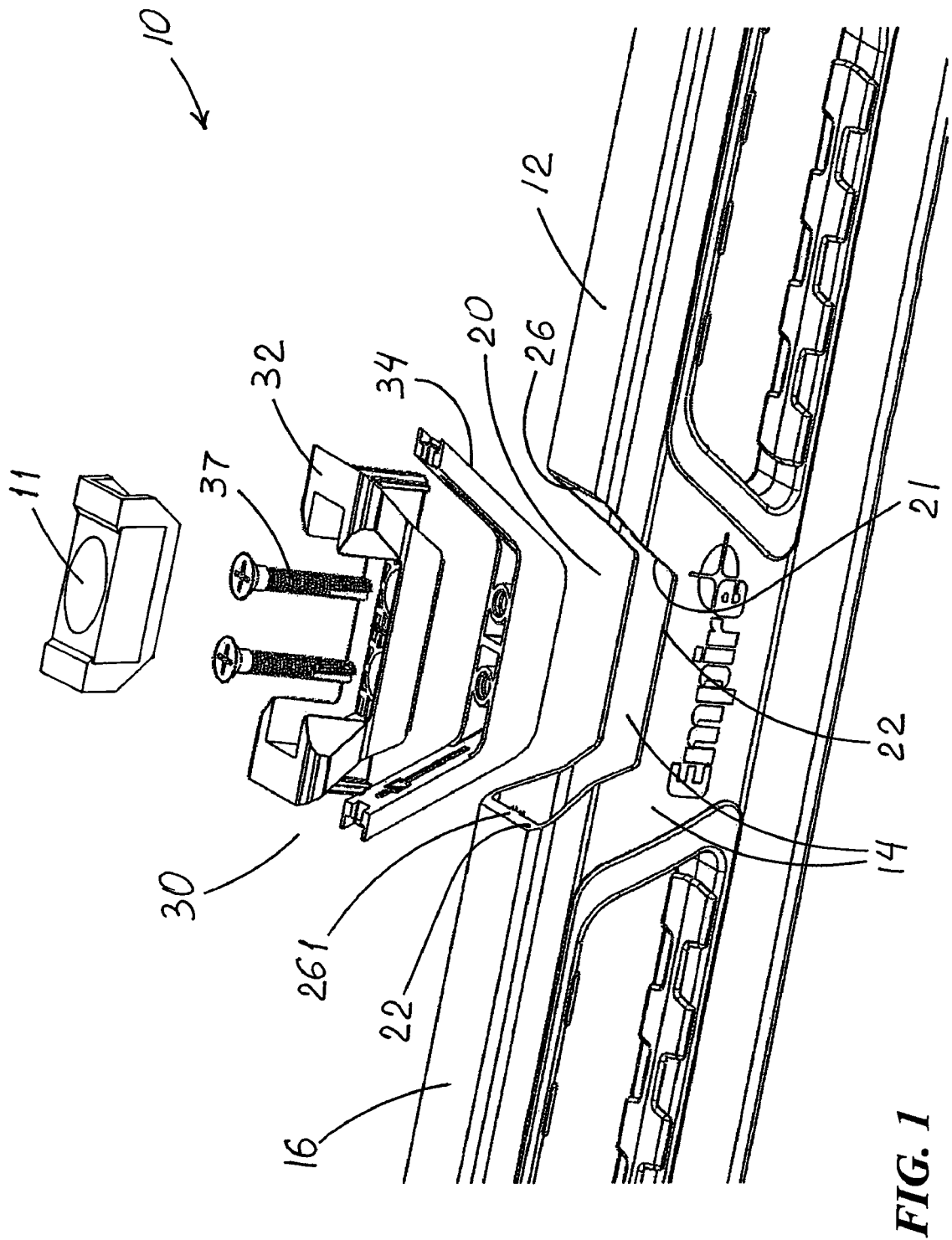
FIG. 1 is a fragmentary exploded perspective view of a level in accordance with this invention.

The drawings show a level 10 that includes an elongate hollow frame 12 with two sidewalls 14 and a topwall 16 extending therebetween. Walls 14 and 16 define a topnotch 20 and have notch-defining edges 21 which include non-vertical surfaces 22. A vial 11 is mounted within topnotch 20.

FIG. 1 shows that level 10 with an inventive vial-mounting structure 30 which includes a vial-holding member 32 and a locking member 34 movably secured with respect to vial-holding member 32. As best seen in FIGS. 3-7, vial-holding member 32 is configured for resting on non-vertical notch-edge surfaces 22. Locking member 34 includes frame-engaging portions 35 which press upwardly against a frame inner surface 13 (see FIGS. 2 and 7) to pull vial-holding member 32 downwardly against non-vertical notch-edge surfaces 22. As seen in FIGS. 4 and 6-8, such downward pulling secures vial-holding member 32 to frame. FIG. 7 further illustrates frame-engaging portions 35 of locking member 34 pressing upwardly against lower surface 17 of topwall 16.

Figure 2:
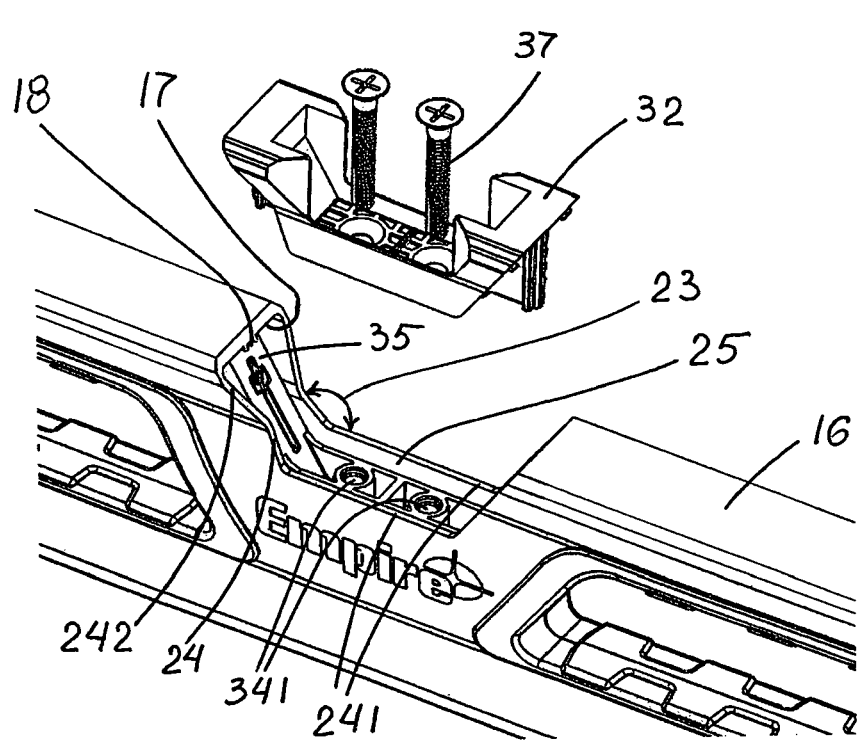
FIG. 2 is a fragmentary perspective view of a frame of the level of FIG. 1 showing an exploded view of a vial-mounting structure with locking member within the frame.

As best seen in FIGS. 1 and 2, non-vertical surfaces 22 of notch-defining edges 21 include substantially horizontal surfaces 241 of sidewall-edges 24. Such horizontal surfaces 241 define a notch bottom 25. Non-vertical surfaces 22 also include inclined surfaces 242 which extend from notch bottom 25 to topwall 16. Each inclined surface 242 is at an obtuse angle 23 with respect to notch bottom 25. Non-vertical surfaces 22 further include topwall-edge surfaces 26 which are upwardly-facing bevels 261 adjoining inclined surfaces 242 of sidewall-edges 24. As illustrated in FIGS. 2 and 7, locking member 34 presses upwardly against lower surface 17 of topwall 16, whereby vial-holding member 32 and locking member 34 sandwich topwall 16 therebetween.

FIGS. 3-6 best show that vial-holding member 32 includes bottom portion 321 which spans the space between sidewalls 14 at notch bottom 25. Bottom portion 321 has a pair of spaced openings 322 therethrough. Locking member 34 includes a pair of threaded apertures 341 each axially aligned with corresponding opening 322. For each threaded aperture 341 and aligned opening 322, there is a threaded drawing rod 37 in threaded engagement with aperture 341. Threaded rod 37 is configured to draw locking member 34 upwardly toward vial-holding member 32 until frame-engaging portions 35 press upwardly against frame inner surface 13. Further drawing of locking member 34 upwardly pulls vial-holding member 32 downwardly against non-vertical notch-edge surfaces 22. As is seen in FIGS. 2 and 7, frame-engaging portions 35 of locking member 34 press upwardly against lower surface 17 of topwall 16.

As best seen in FIGS. 1, 2, 7-12, locking member 34 has a lower portion 342 and upward portions 343. Lower portion 342 defines threaded apertures 341. Each upward portion 343 extends from lower portion 342 to terminate at upper ends 344 which engage frame inner surface 13. Vial-holding member 32 has two side portions 323 which extend from opposite sides 324 of bottom portion 321. Each side portion 323 includes a vertical projection key 325. Each of upward portions 343 of locking member 34 defines a keyway 345 which receives corresponding projection key 325 therethrough (see FIG. 8). Such key-keyway mating engagement facilitates alignment of locking member 34 and vial-holding member 32. FIGS. 1 and 2 further show that lower surface 17 of topwall 16 of frame 12 forms a guiding channel 18 extending from a lower end of each bevel 261. Each channel 18 is configured to receive corresponding projection key 325 to facilitate alignment of vial-holding member 32 with non-vertical notch-edge surfaces 22.

Figure 6:
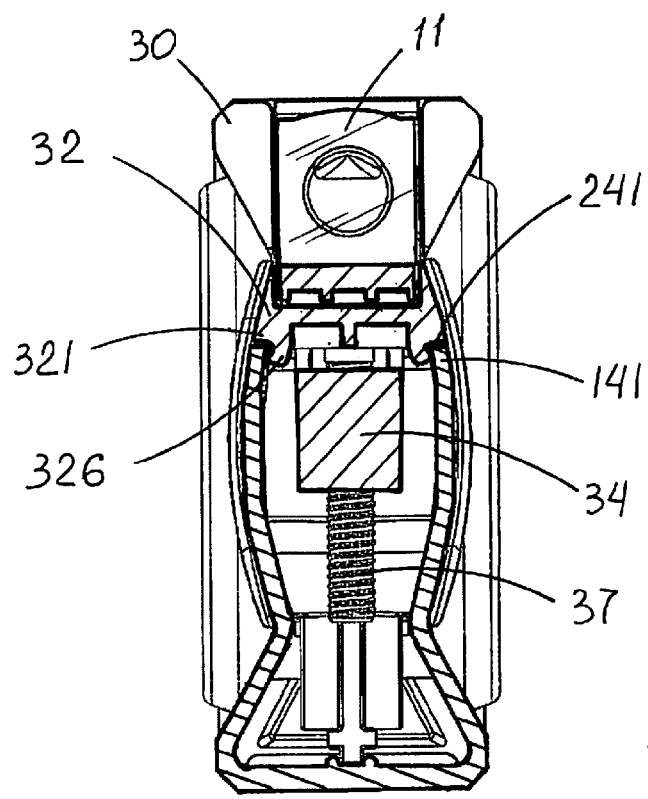
FIG. 6 is a cross-sectional view along lines 6-6 as indicated in FIG. 5.
Figure 7:
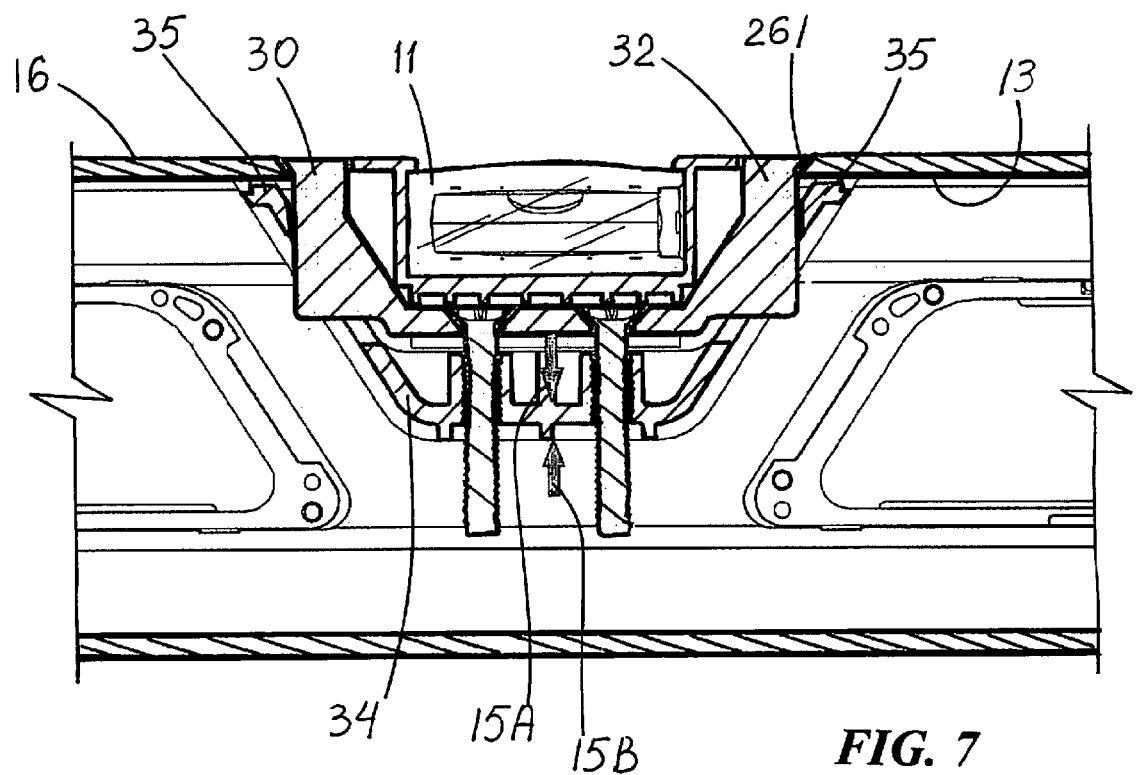
FIG. 7 is a fragmentary cross-sectional view along lines 7-7 as indicated in FIG. 5.
Figure 9:
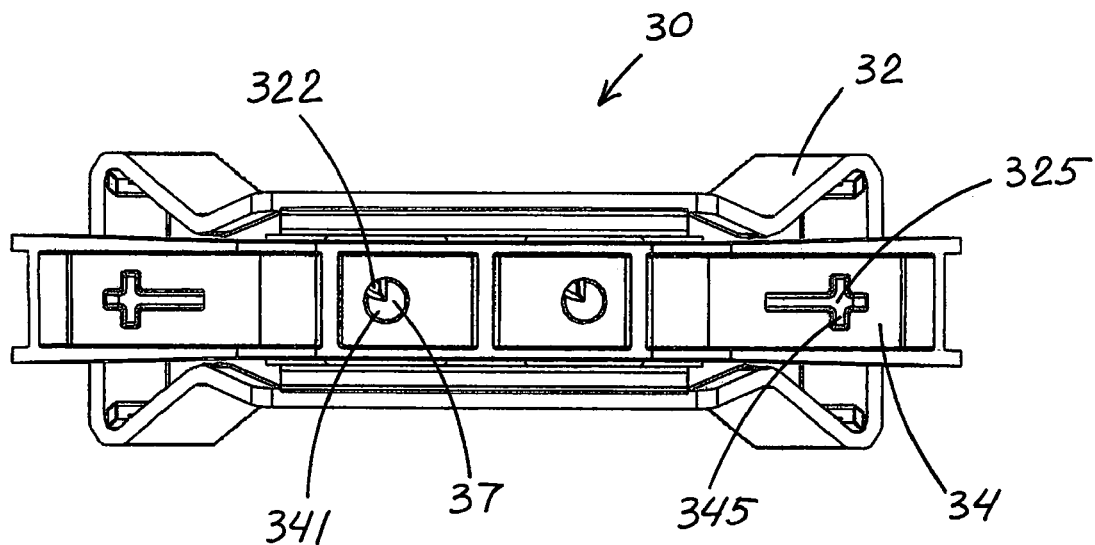
FIG. 9 is a bottom plan elevation of the vial-mounting structure of FIG. 8.

FIG. 6 best shows that notch-adjacent portions 141 of sidewalls 14 extend outwardly from horizontal surfaces 241 of sidewall edges 24. FIGS. 6, 7, 10 and 12 best show that bottom portion 321 of vial-holding member 32 further has a snapping tab 326 extending along each side of bottom portion 321. When vial-holding member 32 is placed on horizontal surfaces 241 of sidewall edges 24, vial holding member 32 is pushed down such that tabs 326 come into a snap engagement with notch-adjacent portions 141 of sidewalls 14 to preliminary secure vial-holding member to frame 12.

The snap engagement may provide permanent mounting if coupled with an adhesive along bevels 261 of topwall-edge surfaces 26. However, such snap-engagement and adhesive mounting does not withstand certain stresses of impact and the vial becomes disassembled from the frame. In addition, the adhesive has a thickness that effects accuracy in installing the vial-holding member. Application of adhesive also presents a risk of dirtying the level which degrades overall quality of the final product. The present invention provides a superior vial-mounting structure with secure vial mounting and improved accuracy.

Figure 4:
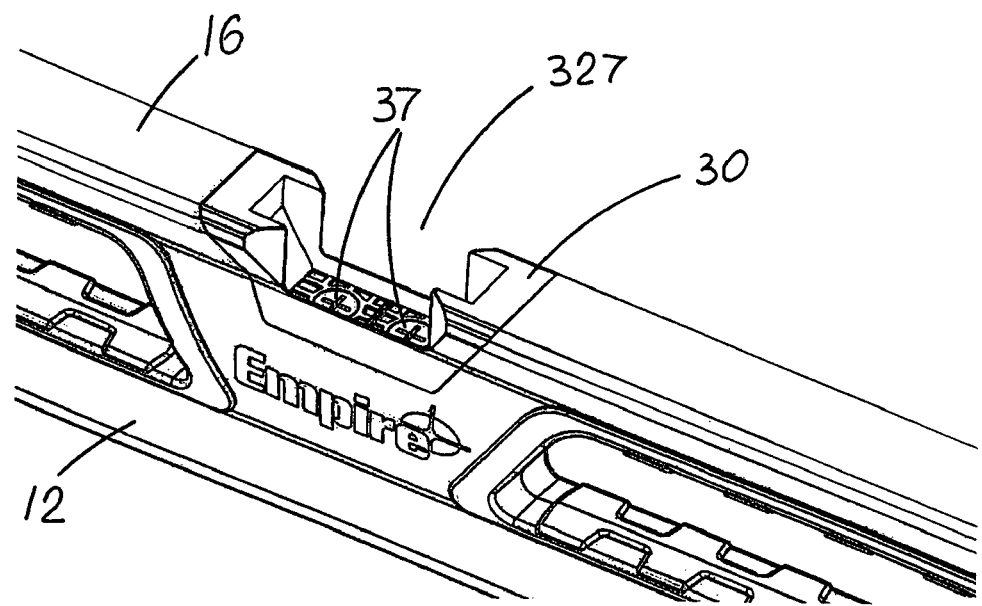
FIG. 4 is a fragmentary perspective view of the frame of the level of FIG. 1 showing a vial-mounting structure secured to the frame.
Figure 5:
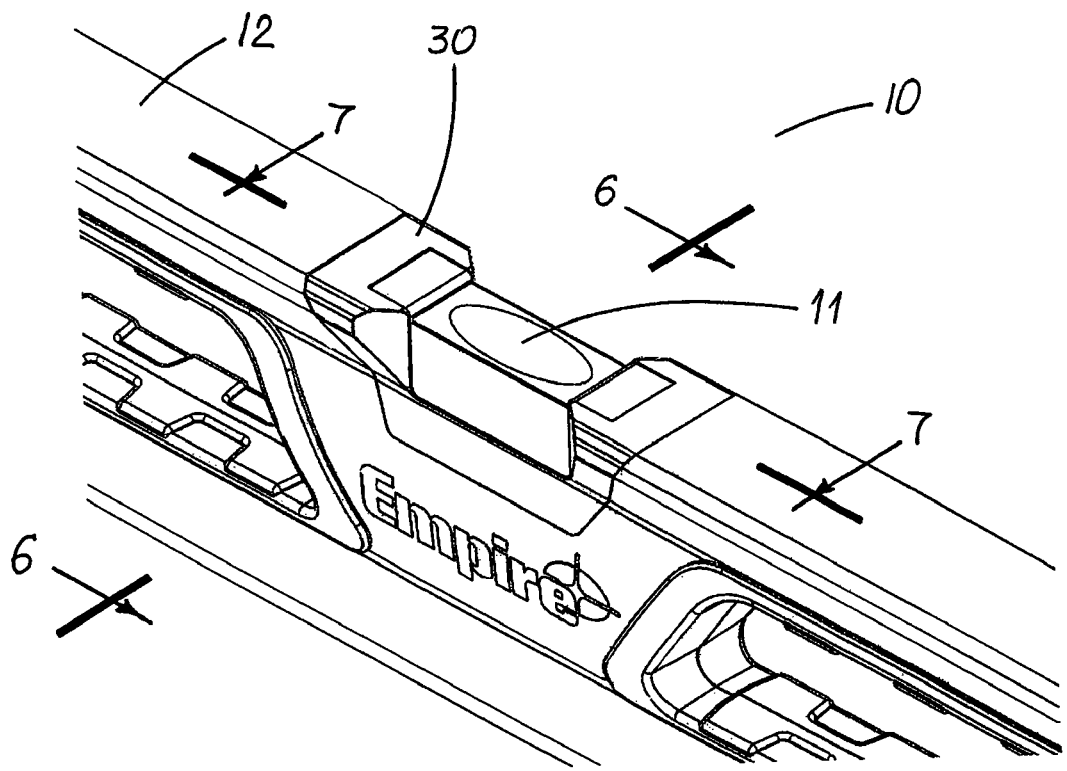
FIG. 5 is a fragmentary perspective view of the level of FIG. 1.

The drawings further show that the vial-holding member forms a vial cavity in which vial 11 is installed after vial-mounting structure 30 is secured frame 12. As seen in FIGS. 1, 4 and 5, vial cavity 327 is shaped to snugly receive vial 11.

FIGS. 1-4 further illustrate a method for securing vial-mounting structure 30 to level 10. The inventive method includes providing vial-mounting structure 30, which has vial-holding member 32 configured for resting on non-vertical notch-edge surfaces 22, and pulling vial-holding member 32 downwardly against non-vertical notch-edge surfaces 22 by a force 15 from inside frame 12 (see FIG. 7), thus securing vial-holding member 32 to frame 12.

Figure 8:
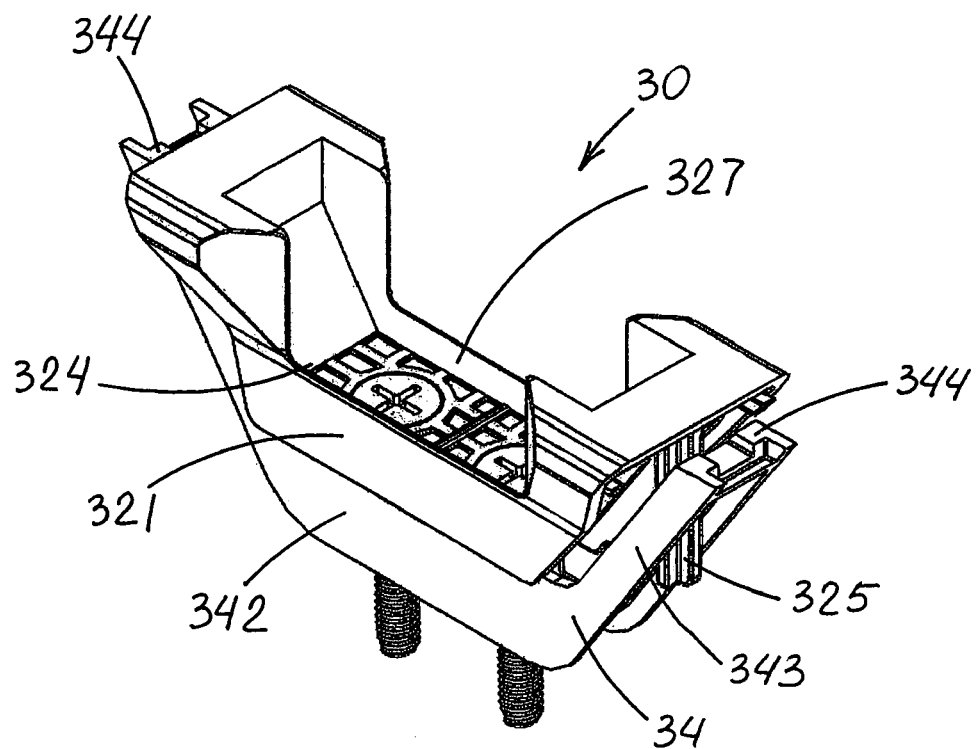
FIG. 8 is a perspective view from above of the vial-mounting structure seen in FIG. 1.
Figure 10:
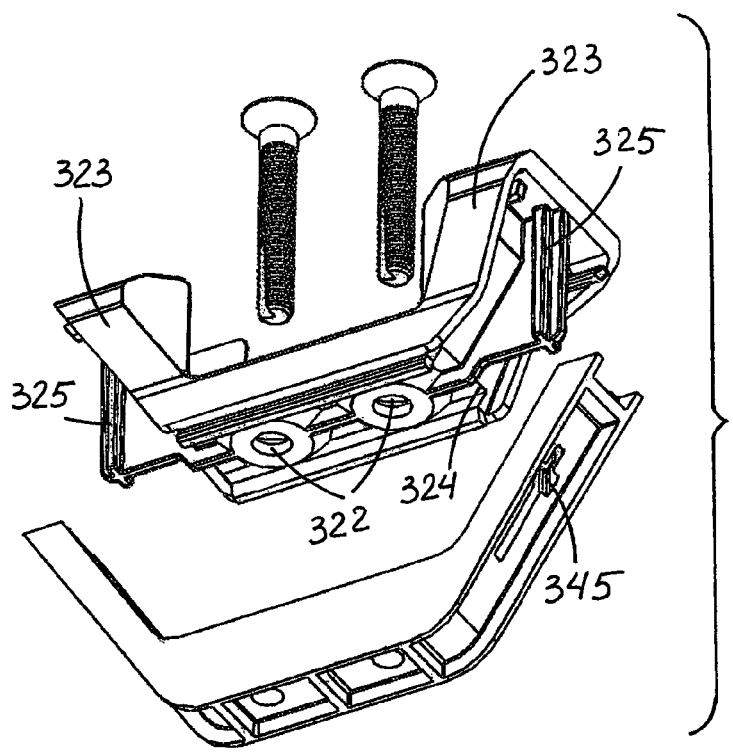
FIG. 10 is an exploded perspective view from below the vial-mounting structure of FIG. 8.
Figure 12:
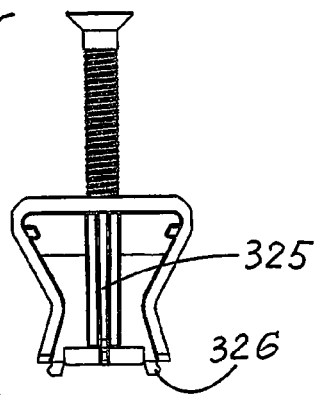
FIG. 12 is an exploded side elevation of the vial-mounting structure of FIG. 8.
Figure 11:
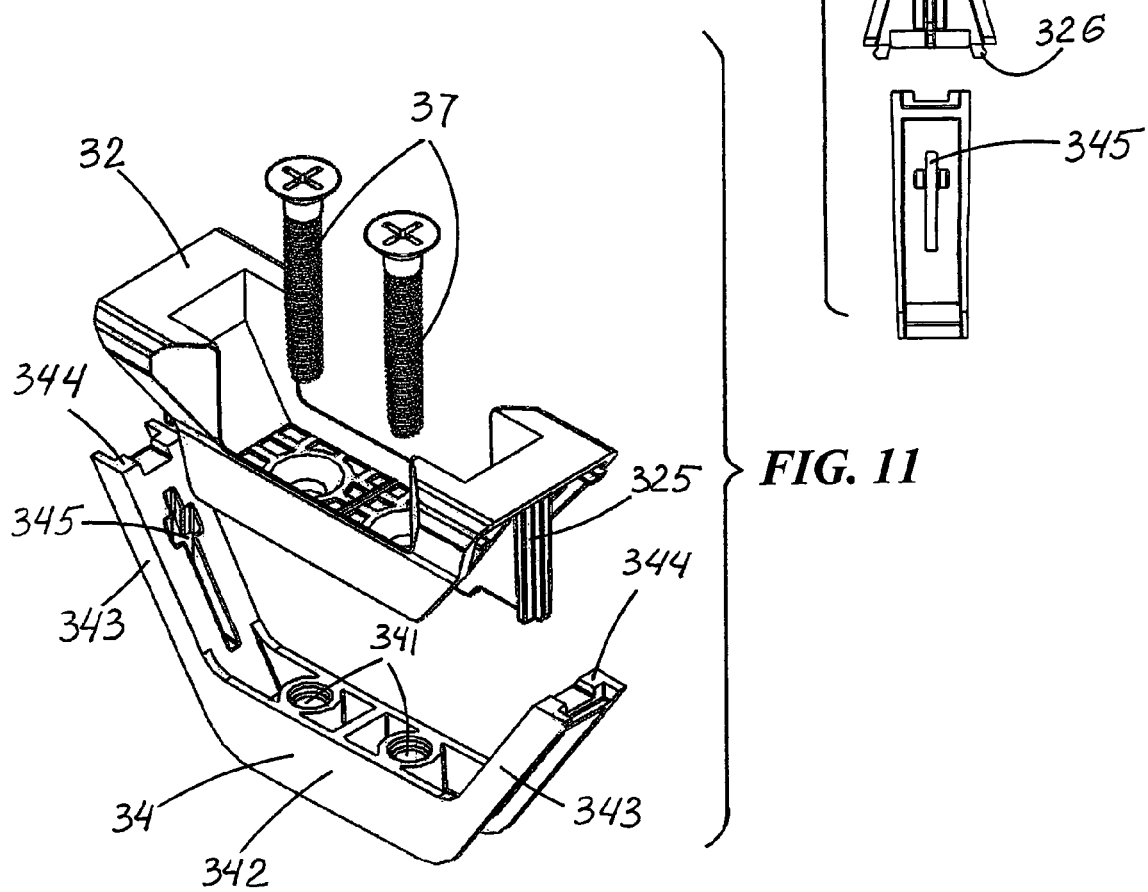
FIG. 11 is an exploded perspective view from above the vial-mounting structure of FIG. 8.

As further illustrated in FIG. 7, downward pulling 15A of vial-holding member 35 is by drawing 15B locking member 34 upwardly toward vial-holding member 32 and against frame inner surface 13. As seen in FIGS. 2 and 7, locking member 34 presses upwardly against lower surface 17 of topwall 16. FIGS. 6-8 show that threaded drawing rods 37 are rotated to draw locking member 34 upwardly toward vial-holding member 32 until vial-holding member 32 is firmly pulled downwardly against non-vertical notch-edge surfaces 22 such that vial-holding member 32 is in its secure and accurate installed position seen in FIGS. 4 and 5.

As non-vertical surfaces 22 include topwall-edge surfaces 26 which are upwardly-facing bevels 261 adjoining sidewall-edges 24, vial-holding member is further configured for resting on bevels 261. FIG. 7 best shows that, when locking member 34 presses upwardly against lower surface 17 of topwall 16, vial-holding member 32 is pulled downwardly against bevels 261 of topwall-edge surfaces 26. Thus, vial-holding member 32 and locking member 34 sandwich topwall 16 therebetween.

When threaded rods 37 connect vial-holding member 32 and locking member 34, locking member 34 is inserted into frame 12 through topnotch 20. However, when locking member 34 is disconnected from vial-holding member 32, locking member 34 may be inserted into frame 12 through any available accesses to take position illustrated in FIG. 2.

Figure 3:
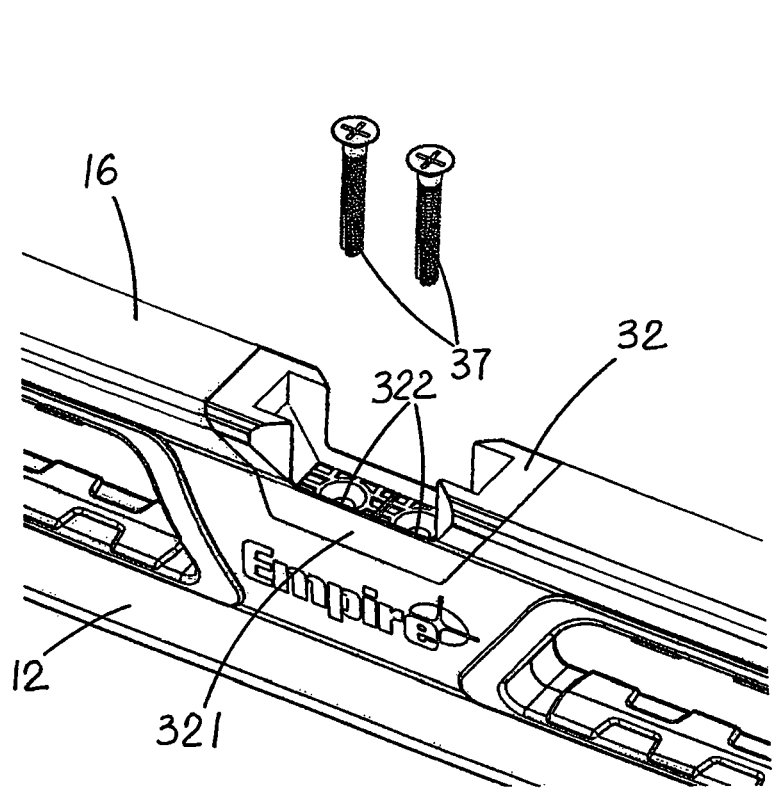
FIG. 3 is a fragmentary perspective view of the frame of the level of FIG. 1 showing an exploded view of the vial-mounting structure with a vial-holding member resting on non-vertical notch-edge surfaces.

FIG. 3 shows vial-holding member 32 placed onto non-vertical notch-edge surfaces 22 after inserting locking member 34 into frame 12 and before the drawing step.

While the principles of the invention have been shown and described in connection with specific embodiments, it is to be understood that such embodiments are by way of example and are not limiting.

The invention claimed is:

1. In a level including (a) an elongate hollow frame with two sidewalls and top and bottom walls extending therebetween, (b) a topnotch defined by the sidewalls and the top wall which have notch-defining edges including non-vertical surfaces, and (c) a vial within the topnotch, the improvement comprising a vial-mounting structure including:
   a vial-holding member resting directly on the outer periphery of the non-vertical notch-edge surfaces; and
   a locking member movably secured with respect to the vial-holding member and including frame-engaging portions which press upwardly against a frame inner surface to pull the vial-holding member downwardly against the non-vertical notch-edge surfaces,
thereby securing the vial-holding member to the frame such that the vial-mounting structure is free from any engagement with the bottom wall.

2. The level of claim 1 wherein the frame-engaging portions of the locking member press upwardly against the lower surface of the topwall.

3. The level of claim 1 wherein the non-vertical surfaces of the notch-defining edges include:
   substantially horizontal surfaces of the sidewall-edges, such horizontal surfaces defining a notch bottom; and
   inclined surfaces extending from the notch bottom to the topwall each at an obtuse angle with respect to the notch bottom.

4. The level of claim 3 wherein:
   the non-vertical surfaces further include topwall-edge surfaces which are upwardly-facing bevels adjoining the inclined surfaces of the sidewall-edges; and the locking member presses upwardly against the lower surface of the topwall, whereby the vial-holding member and the locking member sandwich the topwall therebetween.

5. The level of claim 1 further comprising:
the vial-holding member including a bottom portion spanning the space between the sidewalls at the notch bottom and having at least one opening therethrough;
the locking member including at least one threaded aperture axially aligned with a corresponding opening; and
for each threaded aperture and aligned opening, a threaded drawing rod in threaded engagement with the aperture and configured to draw the locking member upwardly toward the vial-holding member thereby to press its frame-engaging portions upwardly against the frame inner surface and pull the vial-holding member downwardly against the non-vertical notch-edge surfaces.

6. The level of claim 5 wherein the locking member is pressed upwardly against the lower surface of the topwall.

7. The level of claim 5 wherein:
the at least one opening is a pair of spaced openings; and
the at least one threaded aperture includes a pair of threaded apertures.

8. The level of claim 5 wherein the locking member has (a) a lower portion which defines the threaded aperture and (b) upward portions each extending from the lower portion to terminate at upper ends which engage the frame inner surface.

9. The level of claim 8 wherein:
the vial-holding member has two side portions extending from opposite sides of the bottom portion and each side portion includes a vertical projection key; and
each of the upward portions of the locking member defines a keyway receiving a corresponding projection key therethrough,
thereby facilitating alignment of the locking member and the vial-holding member.

10. A method for securing a vial-mounting structure of a level which includes an elongate hollow frame with two sidewalls and top and bottom walls extending therebetween and a topnotch defined by the sidewalls and the top wall which have notch-defining edges including non-vertical surfaces, the method comprising:
providing a vial-mounting structure which includes a vial-holding member configured for resting directly on the outer periphery of the non-vertical notch-edge surfaces;
positioning the vial-holding member directly on the outer periphery of the non-vertical notch-edge surfaces; and
p1 pulling the vial-holding member downwardly against the non-vertical notch-edge surfaces by a force from inside the frame,
thereby securing the vial-holding member to the frame such that the vial-mounting structure is free from any engagement with the bottom wall.

11. The method of claim 10 wherein the vial-mounting structure further includes a locking member movably secured with respect to the vial-holding member, and the pulling of the vial-holding member is by drawing the locking member upwardly toward the vial-holding member and against a frame inner surface until the vial-holding member is firmly pulled downwardly against the non-vertical notch-edge surfaces so the vial-holding member is in its accurate installed position.

12. The method of claim 11 wherein the locking member presses upwardly against the lower surface of the topwall.

13. The method of claim 11 wherein:
the non-vertical surfaces include topwall-edge surfaces which are upwardly-facing bevels adjoining sidewall-edges; and
the locking member presses upwardly against the lower surface of the topwall,
whereby the vial-holding member and the locking member sandwich the topwall therebetween.

14. The method of claim 11 further including the step of inserting the locking member into the frame prior to the drawing step.

15. The method of claim 14 wherein the locking member is inserted into the frame through the topnotch.

16. The method of claim 14 further including, after the inserting step and before the drawings step, placing the vial-holding member onto the non-vertical notch-edge surfaces.

17. The method of claim 11 wherein:
the vial-holding member includes a bottom portion spanning the space between the sidewalls at the notch bottom and having at least one opening therethrough;
the locking member includes at least one threaded aperture axially aligned with a corresponding opening; and
for each threaded aperture and aligned opening, there is a threaded drawing rod in threaded engagement with the aperture and configured to draw the locking member upwardly toward the vial-holding member thereby to draw the locking member upwardly against the frame inner surface and pull the vial-holding member downwardly against the non-vertical notch-edge surfaces.

18. The method of claim 17 wherein the locking member has (a) a lower portion which defines the threaded aperture and (b) upward portions each extending from the lower portion to terminate at upper ends which engage the frame inner surface.

19. The method of claim 18 wherein:
the vial-holding member has two side portions extending from opposite sides of the bottom portion and each side portion includes a vertical projection key; and
each of the upward portions of the locking member defines a keyway for receiving a corresponding projection key therethrough,
thereby facilitating alignment of the locking member and the vial-holding member.

\* \* \* \* \*